United States Patent

Spits et al.

[11] 4,204,782
[45] May 27, 1980

[54] AUTOMATIC SIZING SYSTEM FOR NUMERICALLY CONTROLLED MACHINE

[76] Inventors: Raymond Spits, Perkstraat 76,B-1960, Sterrebeek, Belgium; Hans W. Beck, Im Rot 7,D-6920, Sinsheim, Fed. Rep. of Germany

[21] Appl. No.: 914,665

[22] Filed: Jun. 9, 1978

[51] Int. Cl.² .............................................. B23B 39/08
[52] U.S. Cl. .......................................... 408/3; 408/8; 408/13; 408/146; 29/568
[58] Field of Search ........................ 408/3, 8, 13, 146; 29/568

[56] References Cited

U.S. PATENT DOCUMENTS

| | | | |
|---|---|---|---|
| 3,124,976 | 3/1964 | Pittwood | 408/3 |
| 3,171,327 | 3/1965 | Williamson | 408/3 |
| 3,521,525 | 7/1970 | Williamson | 408/3 |
| 3,899,724 | 8/1975 | Colton | 408/146 |

*Primary Examiner*—Leonidas Vlachos

[57] ABSTRACT

A fixed station at a numerically controlled machine includes gauging means and automatic adjusting means for an adjustable cutting tool installed in the spindle of the numerically controlled machine. Multiple tools stored in the magazine of the NC machine for different cutting operations are provided with a common reference dimension to a cutting point so that the same gauge heads which include differential transducers registering respectively with the cutting point and reference surface of the tool can be employed to effect gauging and adjustment of different cutting tools.

10 Claims, 3 Drawing Figures

AUTOMATIC SIZING SYSTEM FOR NUMERICALLY CONTROLLED MACHINE

BACKGROUND OF THE INVENTION

Adjustable tool inserts such as disclosed in U.S. Pat. Nos. 3,178,969 or 2,946,245 are installed in boring bars or the like with means such as readily accessible hex nut adjustment at the outer face of the insert for effecting precise adjustment while installed in the boring bar. It is known in the art in using such tools in a numerically controlled machine wherein a number of different tools are stored in a magazine for automatic selective installation in the spindle of the NC machine to effect adjustment to the individual tools in a gauging station separate from the NC machine. Adjustment settings may be made relative to a master part or other gauging surface prior to storage of the tools in the magazine of the NC machine and from time to time such tools may be removed from the magazine for servicing and readjustment. Dimensional variations from wear in the cutting tools or otherwise which may develop between successive cutting operations are known by post gauging operations or by periodic tool inspections which require removal from the magazine of the NC machine.

SUMMARY OF THE PRESENT INVENTION

The present system is directed to provide gauging and automatic adjusting of individual cutting inserts as installed in a boring bar or the like with such tool installed in the spindle of the NC machine by programming the machine to move the spindle to a gauging station wherein the cutting point registers against a gauge surface which preferably actuates a variable transducer while a preadjustable reference surface provided in the boring bar simultaneously registers with a second gauge surface at the station which may be preferably again a second variable transducer so that a differential electrical voltage signal may be produced and employed to effect an automatic adjustment of the cutting point. If the differential signal results in a null balance zero voltage reading indicating accurate positioning of the cutting point, no adjustment takes place and the program of the NC machine moves the spindle to its operative cutting position. However, if a differential error signal is detected the adjustment mechanism is actuated to adjust the cutting point as required in either direction while the cutting point remains in continuous engagement with the gauge surface, an amplified error voltage being employed to actuate a reversible stepping motor in the direction required for adjustment until a null balance in the differential signal is reached thereby in effect providing an analog adjustment to precisely the correct relation with the gauge surface of the boring bar. A master part in the magazine may be employed for initial manual adjustment of the differential null balance point in the gauging system which may be common for all tools stored in the magazine. Individual adjustable reference surfaces in the respective tools may likewise be manually preadjusted relative to a perfect hole size, for example, whereupon the automatic adjustment of the cutting point at the gauging station will be assured for all tools stored in the magazine of the NC machine.

As an alternate to the differential gauging a single cutting point gauge may be employed with reliance on the accuracy of the NC programmed positioning of the spindle as a substitute for the reference gauge surface on the tool itself.

In either case the automatic gauging and adjustment takes place with the tool installed in the spindle of the NC machine and the machine may be programmed for gauging and adjustment before every cutting operation or as often as precision of tolerance requirements may require. Gross errors such as may arise from breakage of the cutting point may be automatically detected by establishing limits for the transducer gauge which will stop the operation of the machine and signal for manual servicing.

BRIEF DESCRIPTION OF THE DRAWINGS

With reference to FIG. 1 an adjustable tool insert 10 of the type disclosed in U.S. Pat. No. 3,178,969 is shown installed in a boring bar 11 having an adjustable reference gauge surface 12 having a predetermined vertical dimensional relationship with a cutting point 13 of the cutting insert. A variable transducer gauge surface 14 is adapted to register with the reference surface 12 of the boring bar while a second variable transducer gauge surface 15 simultaneously registers with the cutting point 13. The respective associated variable transducer cores 16 and 17 are displaceably mounted for parallel vertical displacement in a fixed housing 18 mounted at a gauging station of an NC machine (not shown) in a position such that the spindle of the machine with a boring bar 11 mounted therein may be programmed for movement under numerical control to the gauging and adjustment position shown. The transducer core 17 is freely slidable within a transducer sleeve 19 rigidly mounted on a retainer plate 20 while a similar provision (not shown) for the transducer core 16 likewise accommodates free vertical movement of the gauge surface 14 relative to the fixed housing 18. A hex socket 21 engageable with a hex nut 22 of the adjustable tool insert as shown is mounted in a drive head 23 rotatably mounted within the housing 18 and axially displaceable against the resilient compression spring 24 while drivingly engaged by a pair of pins 25 freely slidable within fixed rotatable worm wheel 26 drivingly engaged by a worm gear 27 driven by an electrical stepping motor 28 as shown in FIG. 2.

Figure 1:
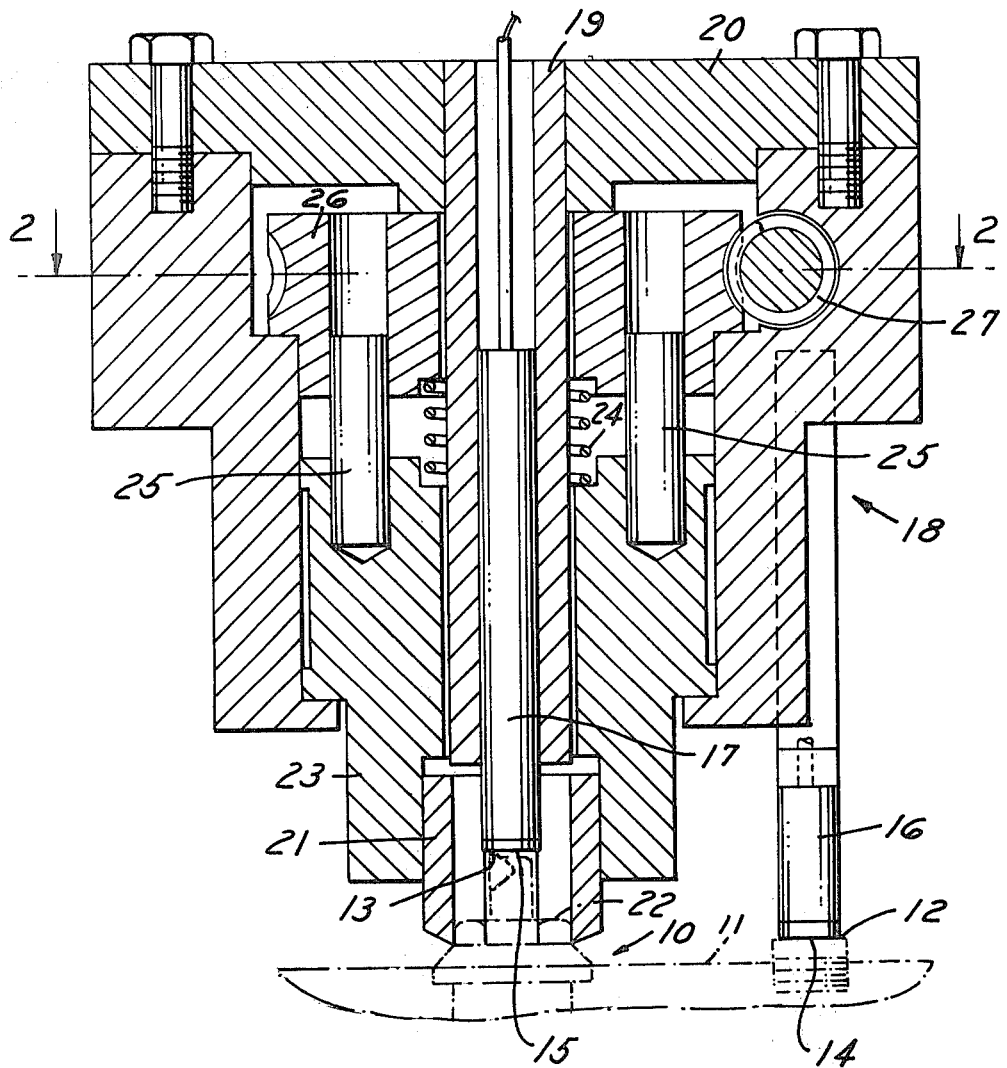
FIG. 1 is a sectional side elevation of the gauging and adjustment mechanism employed at a fixed gauging station of an NC machine.
Figure 2:
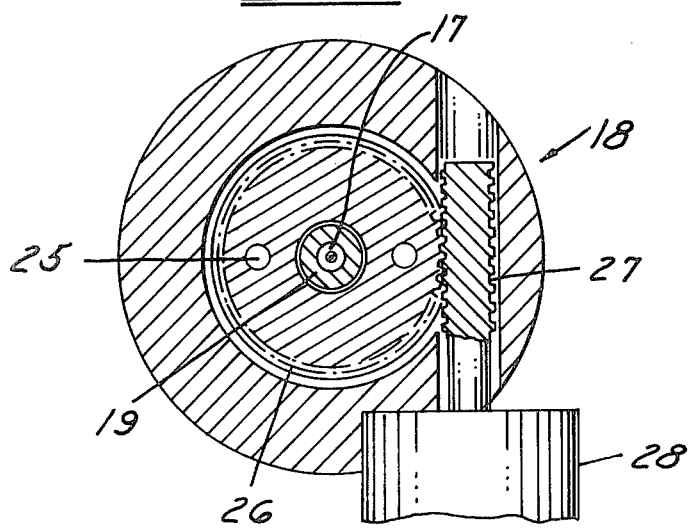
FIG. 2 is a sectional plan view taken along the line 2—2 of FIG. 1.

When the boring bar 11 is initially moved toward gauging position the socket 21 may not register with the hex nut 22 in which case the driving head 23 is displaceable against the compression spring 24. If when the gauging position of the boring bar 11 has been reached the respective gauging surfaces 14 and 15 are in a relative null balance position indicating an accurate relative location of the cutting point 13 to the gauge surface 12 of the boring bar, nothing further takes place at the gauging station and the machine spindle with the boring bar is moved under the numerical control program to its operative cutting position.

If, however, the relative displacement of the respective transducer cores 16 and 17 are not in null balance position so that a voltage signal arises the worm gear 27 is actuated to initially pulse the drive head 23 and socket 21 into registration with the hex nut 22 whereupon depending on whether the error signal indicates a plus or minus required adjustment the stepping motor 28 will be actuated in a corresponding direction to produce a plus or minus adjustment in the level of the cutting point 13 relative to the gauge surface 12.

Figure 3:
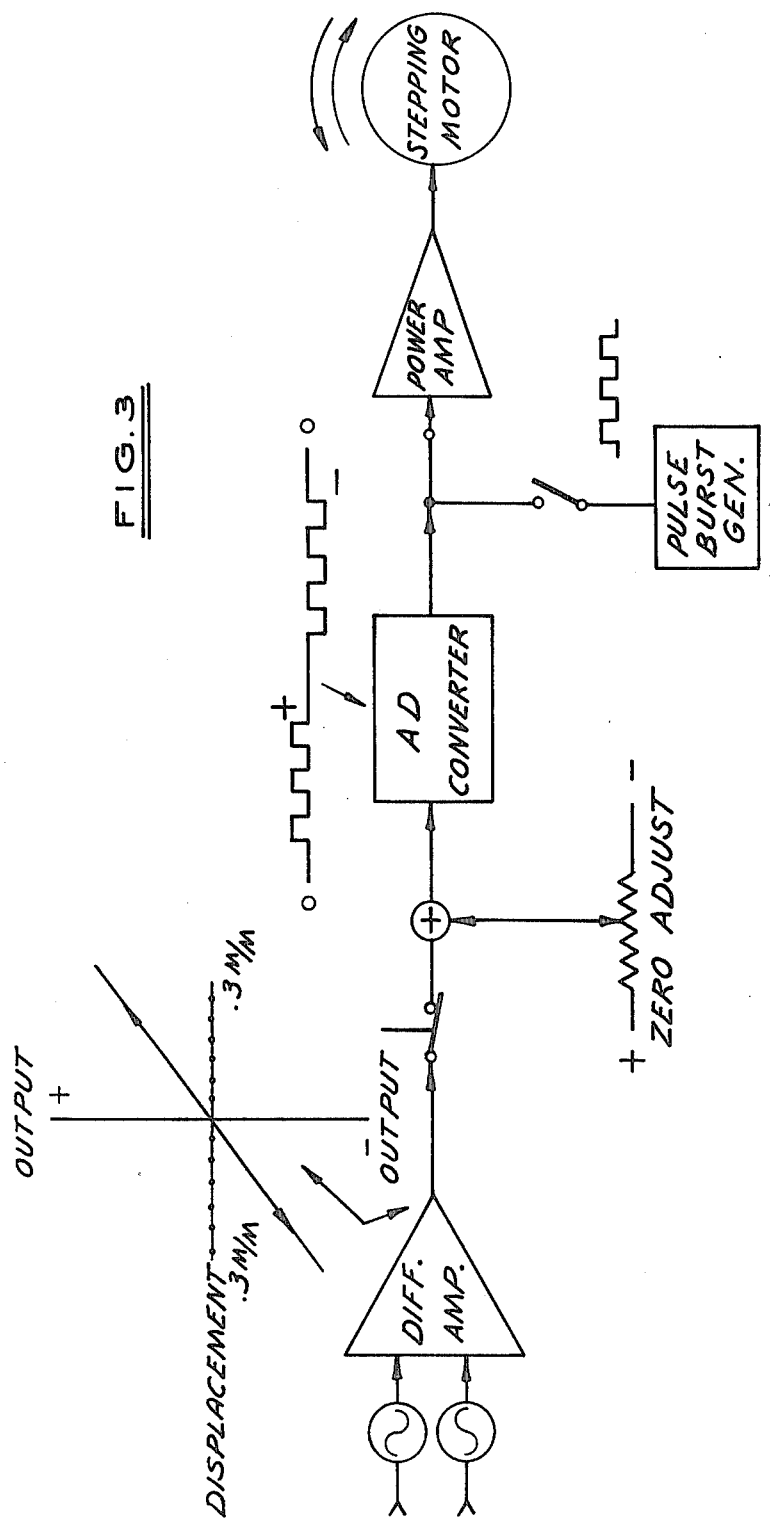
FIG. 3 is a schematic electrical control diagram for the preferred embodiment.

The electrical components of this control system will be understood from an examination of the labeled elements in the schematic diagram of FIG. 3.

It will be understood that in the alternative single transducer system only the cutting tool transducer 17 would be employed which would be adjusted to provide a null balance signal relative to a predetermined position of the spindle axis of the NC machine which would be programmed according to the cutting radius of the particular cutting tool which the tool changer has automatically installed. While such a programmed translation of the spindle to a gauging position is involved in either of the single transducer or differential system, the latter is preferable for extreme accuracy requirements since it eliminates any error in the axis movements of the spindle as well as possible flexation of the boring bar.

In operation it will be understood that all boring bars or like tools in a single magazine on a particular NC working center must have the same adjustable tool insert units built in. As previously mentioned a master part in the magazine is used one time to zero in the amplifier. All boring bars have the same fixed dimension from the cutting edge to the adjustable reference point of the boring bar. Such reference point is set only one time to the proper dimension in reference to the cutting edge after a perfect hole has been machined. After setting all the reference points of all the tools the normal working procedure can take place. A tool changer will remove a tool from the magazine and install it into the spindle. A single slot for the drive key requires a very close tolerance so that no play occurs between the drive key and slot in order to assure a perfect positioning of the cutting edge. The center point of the spindle as mentioned will be programmed differently from tool to tool.

In order to sort out tools with chipped inserts or dislocated tools the high and low limits of the amplifier respectively should be set to about 0.2 mm. The gauge itself can be set with a high and low limit with a zero point right in the middle.

What is claimed is:

1. An automatic sizing system for a numerically controlled machine having interchangeable tooling adjustable in its operatively installed condition comprising a combination gauging and adjusting station, means at said station for gauging the effective cutting position of an operatively installed cutting tool on either side of a nominal required cutting position when moved to a gauging position by said numerically controlled machine, and means responsive to said gauging means during continuous gauging of said cutting position for effecting any required adjustment of said cutting tool in either direction to reach said nominal position.

2. A sizing system as set forth in claim 1 including variable transducer means for producing an electrical signal varying in direction and magnitude with the position of said cutting tool away from said nominal position.

3. A sizing system as set forth in claim 1 including variable transducer means for producing an electrical signal varying with the position of said cutting tool, and an electric motor adapted to effect adjustment responsive to said electrical signal.

4. A sizing system as set forth in claim 1 including variable transducer means for producing an electrical signal varying with the position of said cutting tool, said tooling including reference gauge surface having a predetermined dimensional relationship with the required cutting position of said cutting tool, and means at said gauging station for simultaneously gauging and the differential relationship between said reference surface and the cutting position of said cutting tool.

5. A sizing system as set forth in claim 1 including variable transducer means for producing an electrical signal varying with the position of said cutting tool, said tooling including reference gauge surface having a predetermined dimensional relationship with the required cutting position of said cutting tool, and means at said gauging system for simultaneously gauging the differential relationship between said reference surface and the cutting position of said cutting tool, said last means including a variable transducer engageable by said reference surface, and means for producing an electrical signal responsive to and varying with the differential relation of said reference surface and said cutting tool.

6. A sizing system as set forth in claim 1 including mechanical drive means at said station engageable with said adjustable tooling when moved to said station by said numerically controlled machine, and means for causing said mechanical drive means to operatively engage said adjustable tooling for adjustment in either direction responsive to an electrical signal from said gauging means indicating adjustment requirement.

7. A sizing system as set forth in claim 1 including mechanical drive means at said station engageable with said adjustable tooling when moved to said station by said numerically controlled machine, and means for causing said mechanical drive means to operatively engage said adjustable tooling responsive to an electrical signal from said gauging means indicating adjustment requirement, said last means including a resiliently biased socket wrench adapted to engage a tooling adjustment nut.

8. A sizing system as set forth in claim 7 including a stepping motor and worm gear for producing rotation of said adjustment socket in either required direction.

9. A sizing system as set forth in claim 1 including respective coaxial means for gauging and effecting adjustment.

10. A sizing system as set forth in claim 5 wherein said respective variable transducer means are mounted in parallel relationship.

* * * * *